United States Patent [19]

Schwindt et al.

[11] 4,254,229
[45] Mar. 3, 1981

[54] POLYURETHANE PLASTICS CONTAINING THIO GROUPS

[75] Inventors: Jürgen Schwindt; Gerhard Grögler, both of Leverkusen; Paul Uhrhan, Cologne, all of Fed. Rep. of Germany

[73] Assignee: Bayer Aktiengesellschaft, Leverkusen, Fed. Rep. of Germany

[21] Appl. No.: 106,976

[22] Filed: Dec. 26, 1979

Related U.S. Application Data

[63] Continuation of Ser. No. 925,349, Jul. 17, 1978, abandoned.

[30] Foreign Application Priority Data

Jul. 30, 1977 [DE] Fed. Rep. of Germany ....... 2734574

[51] Int. Cl.³ ............... C08G 18/14; C08G 18/32; C07C 149/40
[52] U.S. Cl. ............... 521/163; 521/159; 528/64; 528/68; 560/18
[58] Field of Search ............... 521/163, 159; 528/64, 528/68

[56] References Cited

U.S. PATENT DOCUMENTS

| | | | |
|---|---|---|---|
| 3,538,228 | 11/1970 | Nair | 424/325 |
| 3,586,649 | 6/1971 | Cobbledick | 521/163 |
| 3,655,597 | 4/1972 | Strassel | 521/163 |
| 3,736,295 | 5/1973 | Meckel et al. | 528/64 |
| 3,789,072 | 1/1974 | Bernstein | 260/557 B |
| 3,897,400 | 7/1975 | Finelli | 528/64 |
| 3,905,944 | 9/1975 | Finelli | 528/64 |
| 3,920,617 | 11/1975 | Hirosawa et al. | 528/64 |
| 4,031,049 | 6/1977 | Hirosawa et al. | 521/163 |

*Primary Examiner*—H. S. Cockeram

*Attorney, Agent, or Firm*—Gene Harsh; Joseph C. Gil; R. Brent Olson

[57] ABSTRACT

The instant invention is directed to polyurethane plastics which may be cellular, produced by reaction of polyisocyanates with relatively high molecular weight polyhydroxyl compounds and, optionally, low molecular weight polyhydroxyl compounds, and diamines, said polyurethane plastic containing structural units corresponding to the general formula

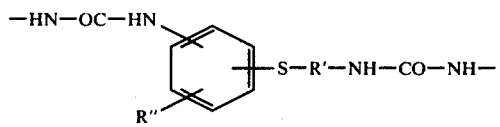

in which
R' represents a straight or branched divalent aliphatic, cycloaliphatic or aromatic radicals containing from 2 to 20 carbon atoms and
R" represents hydrogen, a straight or branched alkyl radical containing from 1 to 6 carbon atoms, an aryl radical containing from 6 to 15 carbon atoms, a cycloalkyl radical containing from 4 to 12 carbon atoms, halogen, —NO₂, —CN, —OR''' or a radical

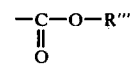

where
R''' represents a straight or branched alkyl radical containing from 1 to 6 carbon atoms.

22 Claims, No Drawings

POLYURETHANE PLASTICS CONTAINING THIO GROUPS

This is a continuation of application Ser. No. 925,349 filed July 17, 1978, now abandoned.

BACKGROUND OF THE INVENTION

The use of aromatic diamines as chain extenders in the production of polyurethanes is known. In order to ensure reasonable processing times, reactive aromatic isocyanates, which are the most widely used in practice, are preferably reacted with sluggishly reacting diamines. The sluggishly reacting diamines used include aromatic diamines wherein the basicity, and therefore, the reactivity towards isocyanates, has been reduced by the introduction of halogen or carboxy substituents. 3,3'-Dichloro-4,4'-diaminodiphenyl methane (MOCA), which hitherto has been the most widely used, is an example of one such aromatic diamine. However, the main disadvantage of this compound is its toxicity. U.S. Pat. No. 3,823,833 discloses using 2,2'- or 4,4'- diaminodiphenyl sulphide as chain extender in the production of polyurethane systems. However, the disadvantages of these compounds are the susceptibility of the S-S-group in the polyurethane segment to cleavage by reduction or oxidation, the short pot lives, and the long in-mold times during the reaction with polyisocyanates, which preclude economic processing.

Published Japanese Specification No. 9195/70 describes a concentrated polyurethane solution which may be used for the production of fibers, films or artificial leather. The chain extender used is a diamine of the formula $NH_2-R-(SR)_n-NH_2$ where R is an aliphatic, aromatic, alicyclic or heterocyclic group and n=1 or 2. The main disadvantage of a system extended with diamines such as these is the fact that the excessive reactivity of the amino groups to isocyanates necessitates the use of an organic solvent which considerably increases the costs, necessitates additional extraction equipment, and involves the danger of fire and explosions.

In U.S. Pat. No. 3,920,617, it is proposed to use sulfur-containing polyamines corresponding to the general formula

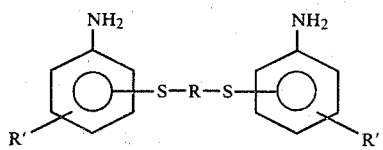

as chain extenders in the production of polyurethane elastomers. This type of compound provides for a sufficiently long processing time at temperatures in the range from 25° to 60° C. However, the elastomers obtained are inadequately crosslinked and inhomogeneous because of the excessive viscosity of NCO-prepolymers at processing temperatures used. Although homogeneous elastomers are obtained at processing temperatures in the range of 80° to 110° C., the pot life is only slightly increased in comparison with MOCA, with the result that the processing conditions are not significantly improved when compared to the aromatic diamines of the prior art.

An object of the present invention is to obviate the above-described disadvantages attending conventional aromatic diamine chain extenders, such as toxicity and ready cleavage of the S-S-group by reduction or oxidation, and the polyurethane elastomers obtainable therefrom and, additionally, to provide reactive polyurethane systems which have the advantage of solvent-free processing, longer pot lives and shorter in-mold times.

DESCRIPTION OF THE INVENTION

The present invention relates to polyurethane plastics, which may be cellular, produced by the reaction of polyisocyanates with relatively high molecular weight polyhydroxyl compounds and, optionally, low molecular weight polyhydroxyl compounds, and sulfur-containing diamines. Said polyurethane plastic characterized by the fact that they contain structural units of the formula

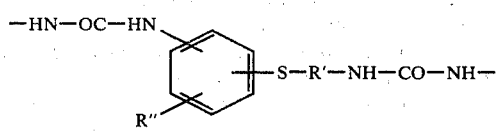

in which
  R' represents an optionally branched divalent aliphatic, cycloaliphatic, araliphatic or aromatic radical containing from 2 to 20 carbon atoms and preferably from 2 to 12 carbon atoms and
  R" represents hydrogen, a straight or branched alkyl radical containing from 1 to 6 carbon atoms, preferably from 1 to 3 carbon atoms, an aryl radical containing from 6 to 15 carbon atoms, preferably from 6 to 10 carbon atoms, a cycloalkyl radical containing from 4 to 12 carbon atoms, preferably from 6 to 9 carbon atoms, halogen, $-NO_2$, $-CN$, $-OR'''$ or a radical

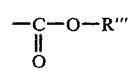

in which
  R''' represents a straight or branched alkyl radical containing from 1 to 6 carbon atoms.

Preferred products are those in which the urea group is in the ortho or meta position, particularly the ortho position, to the sulfur.

The present invention also relates to a process for the production of polyurethane plastics which may be cellular, by reacting polyhydroxyl compounds having a molecular weight of from 400 to 10,000 and, optionally, low molecular weight polyhydroxyl compounds with polyisocyanate and araliphatic diamines as chain extenders, optionally in the presence of catalysts, blowing agents and other additives, wherein the diamines are compounds of the formula

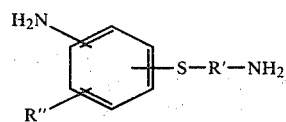

in which R' and R" are as defined above.

It has been found that in particular the araliphatic diamines in which the amino group is in the o-position to the sulfur may be used in cast elastomer systems and foaming processes, even without the addition of organic solvents, and in this connection provide for excellent processing conditions both in the production of elastomers and also during foaming.

It has surprisingly been found that the aromatically bound amino group reacts so sluggishly by comparison with the aliphatically bound amino group that long in-mold times are obtained. Despite a rapid preliminary reaction of the aliphatically bound amino-group with isocyanate, the viscosity of the reacting mixture increases only slightly so that a sufficiently long processing time is guaranteed, even at a processing temperature of 110° C.

Other advantages of these chain extenders are that they are easy to obtain, that they are generally liquid at room temperature, that they have a low melting point and that the reacting PUR-systems have extremely long pot lives. The low melting point makes them particularly easy to use because the diamines do not have to be melted before addition to the reaction mixture, so that energy costs are additionally saved.

It is preferred to use araliphatic diamines in which the aromatic amino group is in the o-position to the sulfur. Diamines in which R″ represents hydrogen or methyl, particularly hydrogen, are also preferred.

Particularly preferred polyurethanes are polyurethanes having recurring structural units corresponding to the formula

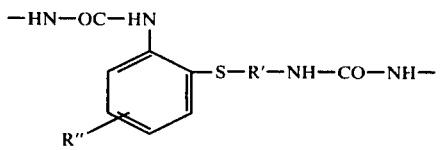

in which R′ and R″ are as defined above.

Particularly preferred diamines correspond to the following formula

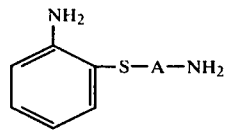

in which A represents a straight- or branched chain aliphatic hydrocarbon radical containing from 2 to 20 carbon atoms, preferably from 2 to 12 carbon atoms and, with particular preference, from 2 to 6 carbon atoms or an araliphatic hydrocarbon radical containing 8 carbon atoms.

A may, for example, represent one of the following divalent radicals: an ethylene, propylene, trimethylene, 1,2-butylene, 1,2-isobutylene, tetramethylene, 2,3-butylene, pentamethylene, 1,2-pentylene, 1,2-isopentylene, hexamethylene, 1,2-hexylene, isobutyl ethylene, octamethylene, dodecamethylene, xylylene or phenylethylene group.

Examples of compounds corresponding to general formula I, some of which are new, include:
2-(2-aminoethylthio)-aniline (Farmaco Ed. Sci. 22 (7) pages 519–27 (1967)),
2-(2-aminopropylthio)-aniline,
2-(3-aminopropylthio)-aniline,
2-(2-amino-2,2-dimethylethylthio)-aniline,
2-(4-aminobutylthio)-aniline,
2-(2-amino-1,2-dimethylethylthio)-aniline,
2-(5-aminopentylthio)-aniline,
2-(6-aminohexylthio)-aniline,
2-(5-aminohexylthio)-aniline,
2-(2-aminoisobutylthio)-aniline,
2-(12-aminododecylthio)-aniline or
2-(2-aminophenylethylthio)-aniline.

Benzothiazole and halogen alkylamines corresponding to formula (II) below or the derivatives thereof defined in detail hereinafter are used as starting materials in the production of the compounds corresponding to general formula (I):

$$X-A-NH_2 \quad (II)$$

In general formula (II), X represents Cl or Br, preferably Cl, and A is as defined above.

To produce the diamines used in accordance with the invention, benzothiazole is heated with an at least stoichiometric quantity, preferably an excess of 0 to 10 mol %, of an alkali metal or alkaline earth metal hydroxide, preferably sodium or potassium hydroxide and, with particular preference, sodium hydroxide. Thereafter the halogen alkylamine or its derivative is added to the reaction mixture, preferably in the form of a solution in a suitable solvent. The reactants are preferably reacted in stoichiometric quantities. However, it is also possible to use an up to ten-fold excess of benzothiazole.

The following solvents are particularly suitable for use in this production process: water, alcohols, such as methyl alcohol, ethyl alcohol, propyl alcohol or isopropyl alcohol; ketones such as acetone or methylethyl ketone; ethylene glycol and its alkyl ethers, diethylene glycol or triethylene glycol or even dimethyl formamide, dimethyl sulphoxide and dioxane; or mixtures thereof.

Preferred solvents are water and lower alcohols; water and mixtures of water with methyl, ethyl or isopropyl alcohol being particularly preferred.

In general, from 200 to 5000 ml of solvent and preferably from 200 to 2000 ml of solvent are used per mol of benzothiazole.

The reaction temperatures are generally in the range from 20° to 180° C. and preferably in the range from 50° to 140° C., the range from 70° to 120° C. being particularly preferred.

The reaction time is generally in the range from 30 minutes to 10 hours, reaction times in the range from 1 hour to 6 hours being preferred.

The reaction pressure is generally in the range from 1 bar to 10 bars. Although the reaction is preferably carried out under normal pressure, it can also be of advantage to work at elevated pressure in order to accelerate the reaction.

Derivatives of halogen alkylamines corresponding to formula (II) above which may be used for the production of compounds corresponding to formula (I) are, the ammonium salts with mineral or organic acids, or amides with carboxylic acids or urethanes corresponding to the general formula

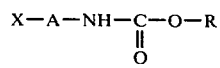

in which R represents an alkyl radical containing from 1 to 6 carbon atoms which may be branched. Preferred ammonium salts are those of hydrochloric, sulfuric, acetic or oxalic acid or hydrogen bromide, ammonium salts of hydrochloric acid and acetic acid being particularly preferred while the preferred urethane is the urethane of tert.-butyl alcohol.

Polyhydroxyl compounds suitable for use in the process have molecular weights in the range from about 400 to 10,000 and preferably in the range from 600 to 4000. The polyhydroxyl compounds in question are polyesters, polyethers, polythioethers, polyacetals, polycarbonates and polyester amides containing at least two, preferably two to four hydroxyl groups, of the type known and/or used for the production of homogeneous and cellular polyurethanes.

Examples of suitable polyesters containing hydroxyl groups are reaction products of polyhydric alcohols and polybasic carboxylic acids. The dihydric alcohols and dibasic carboxylic acids are preferred. Polycarboxylic acid anhydrides or polycarboxylic acid esters of lower alcohols, or mixtures thereof, may also be used for the production of the polyesters. The polycarboxylic acids may be aliphatic, cycloaliphatic, aromatic, and heterocyclic. They also may be substituted, such as by halogen atoms. The polycarboxylic acids also may be unsaturated.

Examples of polycarboxylic acids which may be used are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, which may be mixed with monomeric fatty acids, terephthalic acid dimethyl ester, and terephthalic acid-bis-glycol ester. Examples of suitable polyhydric alcohols are ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethylcyclohexane), 2-methyl-1,3-propane diol, glycerol trimethylol propane, 1,2,6-hexane triol, 1,2,4-butane triol, trimethylol ethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol, and polybutylene glycols. The polyesters may contain terminal carboxyl groups. Polyesters of lactones such as ε-caprolactone may be used, or hydroxy carboxylic acids such as ω-hydroxy caproic acid.

The polyether polyhydroxyl compounds containing at least two, generally two to eight and preferably two to three hydroxyl groups useful in accordance with the invention are known per se and may be obtained by the polymerization of epoxides such as ethylene oxide, propylene oxide, butylene oxide, tetrahydrofuran, styrene oxide or epichlorhydrin. They may be polymerized on their own, or for example in the presence of boron trifluoride. They may also be polymerized by the chemical addition of these epoxides either as mixtures or successively with starter components containing reactive hydrogen atoms. Reactive hydrogen compounds include alcohols or amines; for example water, ethylene glycol, 1,3- or 1,2-propylene glycol, trimethylol propane, 4,4'-dihydroxy diphenyl propane, aniline, ethanolamine, or ethylene diamine. It is also possible to use sucrose polyethers as described in German Auslegeschriften Nos. 1,176,358 and 1,064,938. In many cases, it is preferred to use polyethers wherein the hydroxyl groups are predominantly primary (up to 90% by weight, based on all the hydroxyl groups present in the polyether). Polyethers modified by vinyl polymers by the polymerization of styrene and acrylonitrile in the presence of polyethers as described in U.S. Pat. Nos. 3,383,351; 3,304,273; 3,523,093 and 3,110,695 and German Pat. No. 1,152,526 are also suitable, as are polybutadienes containing hydroxyl groups.

Among the polythioethers, preferred are the condensation products of thiodiglycol with itself and/or with other glycols, dicarboxylic acids, formaldehyde, aminocarboxylic acids or amino alcohols. Depending upon the co-components, these products may be polythio mixed ethers, polythioether esters or polythioether ester amides.

Suitable polyacetals include those compounds which can be obtained from glycols, such as diethylene glycol, triethylene glycol, 4,4'-dioxethoxy diphenyl dimethyl methane, hexane diol and formaldehyde. Suitable polyacetals may also be obtained by polymerizing cyclic acetals.

Suitable polycarbonates containing hydroxyl groups are known per se. They may be obtained by reacting diols with diaryl carbonates or phosgene. Examples of suitable diols are 1,3-propane diol, 1,4-butane diol, 1,6-hexane diol, diethylene glycol, triethylene glycol or tetraethylene glycol. Diphenyl carbonate is a suitable diaryl carbonate.

Examples of the polyester amides and polyamides are the predominantly linear condensates obtained from polybasic anhydrides, and polyhydric amino alcohols, diamines, polyamines and their mixtures.

Polyhydroxyl compounds containing urethane or urea groups and optionally modified natural polyols may also be used. Examples of modified natural polyols are castor oil, carbohydrates and starch. Addition products of alkylene oxides with phenol-formaldehyde resins or urea-formaldehyde resins may also be used.

Representatives of these compounds have been described, in High Polymers, Vol. XVI, "Polyurethanes, Chemistry and Technology" by Saunders-Frisch, Interscience Publishers, New York, London, Volume I, 1962, pages 32–42 and 44–54 and Volume II, 1964, pages 5–6 and 198–199. They are also described in Kunststoff-Handbuch, Volume VII, Vieweg-Höchtlen, Carl-HanserVerlag, Munich, 1966, pages 45 to 71.

The above mentioned polyhydroxyl compounds which have a molecular weight of from 400 to 10,000 may also be used as mixtures. For example, the polyethers and polyesters may be mixed.

The starting components may also include compounds with a molecular weight of from 32 to 400 which have at least two hydroxyl groups. The following are examples of such compounds: Ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis-hydroxymethylcyclohexane, 2-methyl-1,3-propanediol, glycerol, trimethylol propane, hexanetriol-(1,2,6), trimethylolethane, pentaerythritol, quinitol, mannitol and sorbitol, diethylene glycol, triethylene glycol, tetraethylene glycol, polyethylene glycols, dipropylene glycol, polypropylene glycols, dibutylene glycol, polybutylene glycols 4,4'-dihydroxy-diphenyl propane, dihydroxymethylhydroquinone, diethanolamine and triethanolamine. Again, mixtures of the various compounds, having a molecular weight of from 32 to 400 and containing at least two hydroxyl groups may be used.

There may also be used polyhydroxyl compounds which contain high molecular weight polyadducts or polycondensates in a finely dispersed or dissolved form. Such modified polyhydroxyl compounds are obtained when polyaddition reactions or polycondensation reactions are carried out in situ in the above mentioned hydroxyl-containing compounds. An example of the polyaddition reaction is the reaction between polyisocyanates and amino-functional compounds. An example of the polycondensation reaction is the reaction between formaldehyde and phenols and/or amines. Processes of this kind have been described in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. These modified polyhydroxyl compounds may also be obtained according to U.S. Pat. No. 3,869,413 or German Offenlegungsschrift No. 2,550,860 by mixing a previously prepared aqueous polymer dispersion with a polyhydroxyl compound and then removing the water from the mixture.

When modified polyhydroxyl compounds of the type mentioned above are used as starting components in the polyisocyanate polyaddition process, polyurethane materials with substantially improved mechanical properties are generally obtained.

The polyisocyanates used as starting components may be aliphatic, cycloaliphatic, araliphatic, aromatic or heterocyclic. Examples are described by W. Siefken in Justus Liebigs Annalen Der Chemie, 562, pages 75 to 136. Examples are ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethyl cyclohexane as described in German Auslegeshrift No. 1,202,785 and U.S. Pat. No. 3,401,190; 2,4- and 2,6-hexahydrotolylene diisocyanate, also mixtures of these isomers; hexahydro-1,3- and/or 1,4-phenylene diisocyanate; perhydro-2,4'-and/or -4,4' diphenyl methane diisocyanate; 1,3 and 1,4-phenylene diisocyanate; 2,4- and 2,6-tolylene diisocyanate, also mixtures of these isomers; diphenyl methane-2,4'- and-/or -4,4'-diisocyanate; naphthylene-1,5-diisocyanate; triphenyl methane-4,4',4''-triisocyanate polyphenyl polymethylene polyisocyanates, which can be obtained by condensing aniline with formaldehyde, followed by phosgenation as described in British Pat. Nos. 874,430 and 848,671; m- and p-isocyanatophenyl sulfonyl isocyanates according to U.S. Pat. No. 3,454,606; perchlorinated aryl polyisocyanates of the type described in German Auslegeschrift 1,157,601 and U.S. Pat. No. 3,277,138; polyisocyanates containing carbodiimide groups of the type described in German Pat. No. 1,092,007 and U.S. Pat. No. 3,152,162; diisocyanates of the type described in U.S. Pat. No. 3,492,330; polyisocyanates containing allophanate groups of the type described in British Pat. No. 994,890, Belgian Pat. No. 761,626 and published Dutch Patent Application No. 7,102,524; polyisocyanates containing isocyanate groups of the type described in U.S. Pat. No. 3,001,973, German Pat. Nos. 1,022,789, 1,222,067 and 1,027,394 and German Offenlegungsschriften Nos. 1,929,034 and 2,004,048; polyisocyanates containing urethane groups of the type described in Belgian Pat. No. 752,261 or in U.S. Pat. No. 3,394,164. The polyisocyanates used as starting components may also be polyisocyanates containing acylated urea groups as described in German Pat. No. 1,230,778; polyisocyanates containing biuret groups of the type described in German Pat. No. 1,101,394, U.S. Pat. Nos. 3,124,605 and 3,201,372 and British Pat. No. 889,050, polyisocyanates obtained by telomerization reactions of the type described in U.S. Pat. No. 3,654,106, polyisocyanates containing ester groups of the type described in British Pat. Nos. 965,474 and 1,072,956, U.S. Pat. No. 3,567,763 and German Pat. No. 1,231,688; also reaction products of the abovementioned isocyanates with acetals as described in German Pat. No. 1,072,385; and polyisocyanates containing polymeric fatty acid radicals as described in U.S. Pat. No. 3,455,883.

It is also possible to use the isocyanate-group-containing distillation residues obtained in the commercial production of isocyanates, optionally in solution in one or more of the aforementioned polyisocyanates. It is also possible to use any mixtures of the aforementioned polyisocyanates.

In general, it is particularly preferred to use the commercially readily available polyisocyanates. These include 2,4-tolylene diisocyanate, mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates").

In cases where polyurethane foams are to be produced by the process, water and/or readily volatile organic substances may be used as blowing agents in the production of foamed polyurethane plastics.

Suitable organic blowing agents include acetone; ethyl acetate; halogen-substituted alkanes such as methylene chloride, chloroform, ethylidene chloride, vinylidene chloride, monofluorotrichloromethane, chlorodifluoromethane, dichlorodifluoromethane; butane, hexane, heptane or diethyl ether. A blowing effect may also be obtained by adding compounds which decompose at temperatures above room temperature giving off gases, for example nitrogen, or azo compounds such as azoisobutyronitrile. Other examples of blowing agents and information on the use of blowing agents may be found in Kunststoff-Handbuch, Vol. VII, by Vieweg und Höchtlen, Carl-Hanser-Verlag, Munich 1966, on pages 108 and 109, 453 to 455 and 507 to 510.

Catalysts may also be used in the invention. Examples of suitable catalysts are those known per se. The following are examples: tertiary amines such as triethylamine, tributylamine, N-methyl morpholine, N-ethyl morpholine, N-cocomorpholine, N, N,N',N'-tetramethyl ethylene diamine, 1,4-diazabicyclo(2,2,2)-octane, N-methyl-N'-dimethyl aminoethyl piperazine, N,N-dimethyl benzylamine, bis-(N,N-diethylaminoethyl)-adipate, N,N-diethyl benzylamine, pentamethyl diethylene triamine, N,N-dimethyl cyclohexylamine, N,N,N',N'-tetramethyl-1,3-butane diamine, N,N-dimethyl-β-phenylethylamine, 1,2-dimethyl imidazole, 2-methyl imidazole. Other suitable catalysts are Mannich bases of secondary amines, such as dimethylamine; aldehydes, preferably formaldehyde; ketones such as acetone, methylethyl ketone or cyclohexanone; and phenols such as phenol, nonylphenol or bis-phenol.

Examples of tertiary amines containing isocyanate-reactive hydrogen atoms as catalysts are triethanolamine, triisopropanolamine, N-methyl diethanolamine, N-ethyl diethanolamine, N,N-dimethyl ethanolamine, also their reaction products with alkylene oxides, such as propylene oxide and/or ethylene oxide.

Other suitable catalysts are sila amines with carbon-silicon bonds of the type described in U.S. Pat. No. 3,620,984, such as 2,2,4-trimethyl-2-silamorpholine and 1,3-diethyl aminomethyl tetramethyl disiloxane. Other suitable catalysts are nitrogen-containing bases, such as tetraalkyl ammonium hydroxides. Also alkali hydroxides such as sodium hydroxide, alkali phenolates such as sodium phenolate, or alkali alcoholates such as sodium methylate may be used. Hexahydrotriazines may also be used as catalysts.

Organometallic compounds, especially organo tin compounds, may also be used as catalysts. Preferred organo tin compounds are tin(II) salts of carboxylic acids such as tin(II) acetate, tin(II) octoate, tin(II) ethyl hexoate and tin(II) laurate; and the tin(IV) compounds, for example dibutyl tin oxide, dibutyl tin dichloride, dibutyl tin diacetate, dibutyl tin dilaurate, dibutyl tin maleate or dioctyl tin diacetate. It is of course possible to use all of the above-mentioned catalysts in the form of mixtures.

Further representatives of catalysts suitable for use in the invention and details on the way in which the catalysts work may be found in Kunststoff-Handbuck, Vol. VII, by Vieweg and Höchtlen, Carl-Hanser-Verlag, Munich, 1966, on pages 96 to 102.

The catalysts are generally used in quantities of from about 0.001 to 10% by weight, based on the quantity of compounds with at least two isocyanate-reactive hydrogen atoms and a molecular weight in the range from 400 to 10,000.

Surface-active additives such as emulsifiers and foam stabilizers may also be used. Examples of emulsifiers are the sodium salts of castor oil sulfonates or salts of fatty acids with amines such as diethyl amine/oleic acid or diethanolamine/stearic acid. Alkali or ammonium salts of sulfonic acids, such as those of dodecyl benzene sulfonic acid or dinaphthyl methane disulfonic acid; or alkali or ammonium salts of fatty acids, such as ricinoleic acid, or of polymeric fatty acids, may also be used as surface-active additives.

Suitable foam stabilizers are above all polyether siloxanes, especially water-soluble types. These compounds generally have a structure in which a copolymer of ethylene oxide and propylene oxide is attached to a polydimethyl siloxane radical. Foam stabilizers of this kind are described in U.S. Pat. No. 2,834,748, 2,917,480 and 3,629,308.

It is also possible to use reaction retarders such as substances with an acid reaction such as hydrochloric acid or organic acid halides; cell regulators known per se, such as paraffins or fatty alcohols or dimethyl polysiloxanes; pigments or dyes and flameproofing agents known per se, for example trischlorethyl phosphate, tricresyl phosphate or ammonium phosphate and polyphosphate; stabilizers against the effects of ageing and weather; plasticizers and substances with fungistatic and bacteriostatic effects; and fillers such as barium sulfate, kieselguhr, carbon black or prepared chalk. Examples can be found in Kunststoff-Handbuch, Vol. VII, published by Vieweg and Höchtlen, Carl-Hanser-Verlag, Munich, 1966, on pages 103 to 113.

The reaction components are reacted by the single-stage process known per se, by the prepolymer process or by the semi-prepolymer process, in many cases using machines of the kind described in U.S. Pat. No. 2,764,565. Particulars of processing equipment suitable for use in accordance with the invention may be found on pages 121 and 205 of Kunststoff-Handbuch, Vol. VII, published by Vieweg and Höchtlen, Carl-Hanser-Verlag, Munich 1966.

In the production of foams, the foaming reaction is preferably carried out in molds. To this end, the reaction mixture is introduced into a mold. Suitable mold materials are metals, for example aluminum, or plastics such as epoxide resins. Inside the mold the foamable reaction mixture foams and forms the molding. In-mold foaming may be carried out in such a way that the molding has a cellular structure at its surface, or a compact skin and a cellular core. It is possible in this connection to introduce a specified quantity of foamable reaction mixture into the mold so that the foam formed just fills the mold. However, it is also possible to introduce into the mold more foamable reaction mixture than is required for filling the mold with foam. This technique is known as overcharging and is known from U.S. Pat. Nos. 3,178,490 and 3,182,104.

"External release agents", known per se, such as silicone oils, may be used for in-mold foaming. It is also possible to use so-called "internal release agents", optionally in admixture with external release agents, such as are those described in German Offenlegungsschriften Nos. 2,121,670 and 2,307,589.

Cold-hardening foams may also be produced as described in British Pat. No. 1,162,517 and German Offenlegungsschrift No. 2,153,086. However, it is also possible to produce foams by block foaming or by the laminator process known per se.

The quantities in which the reaction components are used are preferably selected in such a way that the molar ratio of polyisocyanates to compounds containing reactive hydroxyl and amino groups, irrespective of the particular processing technique applied, generally amounts to between 0.9:1 and 1.5:1 and preferably to between 1.05:1 and 1.25:1. The percentage content of isocyanate groups in the prepolymer, where the prepolymer stage is involved, may amount to between 1 and 6% by weight. The molar ratio of reactive hydrogen in the chain extender to reactive hydroxyl groups may vary within wide limits and should preferably amount to between 0.4:1 and 1.5:1, resulting in the formation of flexible to rigid polyurethanes. In addition to the diamines used in accordance with the invention, it is also possible proportionately to use other diamines or even diols, for example those mentioned above in connection with the production of the polyhydroxyl compounds, as chain extenders. However, the mol fraction of the amine according to the invention in the chain extender should amount to between 1 and 0.5 and preferably to between 1 and 0.8.

The process according to the invention may be varied in different ways. For example, the compound containing at least two hydroxyl groups and having a molecular weight of from 400 to 10,000 may be reacted with an excess of diisocyanate and the melt poured into molds following addition of the chain extender. After heating for several hours, a high quality elastic polyurethane plastic is obtained.

In another embodiment, the relatively high molecular weight compound containing at least two hydroxyl groups is reacted with an excess of diisocyanate in admixture with the chain extender and the reaction product obtained is formed under heat and pressure after granulation. Depending upon the quantitative ratios in which the reactants are used, it is possible to obtain polyurethane plastics having different degrees of rigidity and different degrees of elasticity. It is also possible in this way to produce plastics which can be processed in the same way as thermoplasts. In another embodiment, the relatively high molecular weight compound containing at least two hydroxyl groups is reacted with a deficit of diisocyanate in admixture with the chain extender used in accordance with the invention, resulting in the formation of a rollable sheet which may subsequently be converted, by crosslinking with more diisocyanate, into a rubber-elastic polyurethane plastic.

Elastomers may be used for a wide variety of applications, for example for shaped articles subjected to severe mechanical stressing such as rollers, V-belts or seals which are exposed to severe thermal or chemical stressing, for example for hot water pipes or in engines, or for the production of films, textile coatings and polyurethane powders.

Chain extension may also be carried out in the presence of the above-mentioned blowing agents and additives, preferably in closed molds, in which case foams having a cellular core and a compact surface are formed.

The elastic and semi-elastic foams obtainable by the process according to the invention are used, for example, as upholstery materials, mattresses, and packaging materials. Because of their non-inflammability, they are also used for those applications where these properties are particularly important such as in automobile and aircraft construction and in transportation in general. The foams may be produced either by the in-mold foaming process or may be obtained by fabrication from block-foamed material.

EXAMPLES

The process according to the invention is illustrated by the following Examples in which the figures quoted represent parts by weight and percentages by weight, unless otherwise indicated.

(A) Production of the diamines

The structure of the aliphatic diamines described in the following was unequivocally established by their infrared, nuclear magnetic resonance and mass spectra and also by elemental analysis.

2-(2-Aminoethylthio)-aniline 135 parts of benzothiazole and 80 parts of sodium hydroxide are boiled under reflux for 3 hours in 200 parts of water. After cooling to 70° C., 200 parts of methanol are added, followed by the dropwise addition over a period of 2 hours at 70° C. of a solution of 116 parts of chloroethylamine. HCl in 200 parts of water. After stirring under reflux for another 3 hours, the mixtue is cooled and a solution of 50 parts of sodium hydroxide in 100 parts of water is added to it. The organic phase is then separated off and the aqueous phase is extracted twice with 100 parts of toluene.

The combined organic phases are concentrated by evaporation, giving 156 parts of 2-(2-aminoethylthio)-aniline in the form of a yellowish liquid boiling at 125° C./0.06 mm.

Elemental analysis ($C_8H_{12}N_2S$):

|  | C | H | N | S |
| --- | --- | --- | --- | --- |
| Calculated | 57.11 | 7.19 | 16.65 | 19.05 |

-continued

Elemental analysis ($C_8H_{12}N_2S$):

|  | C | H | N | S |
| --- | --- | --- | --- | --- |
| Observed | 57.05 | 7.30 | 16.48 | 19.00 |

2-(3-Aminopropylthio)-aniline 270 parts of benzothiazole and 160 parts of sodium hydroxide are boiled under reflux for 3 hours in 400 parts of water. After cooling to 70° C., 250 parts of methanol are added, followed by the dropwise addition over a period of 2 hours at 70° C. of a solution of 260 parts of 2-chloropropylamine·HCl in 500 parts of water. After stirring for another 3 hours at 100° C., the mixture is cooled and a solution of 100 parts of sodium hydroxide in 200 parts of water is added to it. The organic phase is separated off, the aqueous phase is washed twice with 200 parts of toluene and the combined organic phases are concentrated by evaporation, leaving 346 parts of 2-(3-aminopropylthio)-aniline in the form of a yellowish liquid boiling at 130° C./0.04 mm.

Elemental analysis ($C_9H_{14}N_2S$):

|  | C | H | N | S |
| --- | --- | --- | --- | --- |
| Calculated | 59.30 | 7.74 | 15.37 | 17.59 |
| Observed | 59.15 | 7.83 | 15.51 | 17.40 |

2-(6-Aminohexylthio)-aniline 135 parts of benzothiazole and 80 parts of sodium hydroxide are boiled under reflux for 3 hours in 200 parts of water. After cooling to 60° C., 600 parts of methanol are introduced, followed by the dropwise addition over a period of 2 hours at 70° C. of 224.7 parts of N-(6-chlorohexyl)-0-tert.-butyl urethane. After stirring for another 3 hours at 70° C., the mixture is cooled and the organic phase is separated off. The aqueous phase is extracted twice with 150 parts of toluene and the organic phase is subsequently concentrated by evaporation, leaving 308 parts of a yellow, viscous liquid which are added to 950 parts of concentrated hydrochloric acid. After boiling under reflux for 2 hours, the mixture is cooled and alkalized with sodium hydroxide. The organic phase is then separated off, the aqueous phase is extracted twice with 200 parts of toluene and the combined organic phases are concentrated by evaporation, leaving 210 parts of 2-(6-aminohexylthio)-aniline in the form of a yellowish liquid boiling at 145° C./0.04 mm.

Elemental analysis ($C_{12}H_{20}N_2S$):

|  | C | H | N | S |
| --- | --- | --- | --- | --- |
| Calculated | 64.24 | 8.99 | 12.49 | 14.29 |
| Observed | 64.10 | 9.13 | 12.40 | 14.31 |

(B) Production of polyurethane ureas

EXAMPLE 1

7.28 parts of liquid 2-(2-aminopropylthio)-aniline are added at 110° C. to 100 parts of a prepolymer having an NCO-content of 3.7% of polytetrahydrofuran with an average molecular weight of 1500 and 2,4-tolylene diisocyanate ($NCO/NH_2=1.1$). The mixture is homogenized over a period of 30 seconds and cast into a preheated mold. The reacting mixture remains castable for 7 minutes. After tempering for 24 hours at 110° C., a casting with the following mechanical properties is obtained:

| | | |
|---|---|---|
| Tensile strength | DIN 53 504 | 36.9 MPa |
| Elongation at break | DIN 53 504 | 628% |
| Tear propagation resistance | DIN 53 515 | 24.5 kN/m |
| Shore A | DIN 53 503 | 77 |
| Elasticity LeA 18,280 | DIN 53 512 | 30% |

EXAMPLE 2

8.41 parts of liquid 2-(2-aminoethylthio)-aniline are added at 110° C. to 100 parts of a prepolymer having an NCO-content of 4.63% of a polyether mixture consisting of 90% of a polypropylene glycol of OH-number 56 and 10% of a polyether triol of OH-number 35 (trimethylol-propane-started copolymer of propylene oxide and ethylene oxide), tetraethylene glycol and 2,4-tolylene diisocyanate ($NCO/NH_2=1.1$). The mixture is homogenized over a period of 30 seconds and cast into a preheated mold. The reacting mixture remains castable for 4 minutes. After tempering for 24 hours at 110° C., a molding with the following mechanical properties is obtained:

| | | |
|---|---|---|
| Tensile strength | DIN 53 504 | 29.4 MPa |
| Elongation at break | DIN 53 504 | 617% |
| Tear propagation resistance | DIN 53 515 | 32.8 kN/m |
| Shore hardness A | DIN 53 503 | 76 |
| Elasticity | DIN 53 512 | 29% |

EXAMPLES 3 AND 4

The procedure and mixture components are the same as in Examples 1 and 2; however, mixing with the diamines was carried out at room temperature. The mixtures remain castable for several hours and are then cast into preheated molds. The moldings obtained have the same mechanical properties as in Examples 1 and 2.

EXAMPLE 5

Semi-rigid poly-ether urethane foam:
The symbols used in the following have the following meanings:
$T_1$ = beginning of the blowing reaction
$T_2$ = end of the blowing reaction
$T_3$ = tack-free
$T_4$ = hardening time (after this time, it is no longer possible to tear parts of the foam out by hand).
Recipe: 50 g of trifunctional polyether of trimethylol propane, propylene and ethylene oxide, OH-number: 35;
5 g of 2-(2-aminoethylthio)-aniline
0.3 g of triethylene diamine
0.04 g of dibutyl tin dilaurate
6 g of trifluorochloromethane.
The components are mixed at room temperature and stirred with 16.6 g of a crude 4,4'-diisocyanatodiphenyl methane having an NCO-content of 23%.
$T_1$ = 10 seconds
$T_2$ = 30 seconds
$T_3$ = 62 seconds
$T_4$ = 62 seconds.

After mold release a highly elastic semi-rigid foam molding is obtained (unit weight: approximately 400 mg/cc).

EXAMPLE 6

The procedure is as in Example 5 using 100 g of the trifunctional polyether. 10 g of 2-3-aminopropylthio)-aniline are used as the araliphatic sulfur-containing diamine and 5 g of N-methyl diethanolamine are additionally used as low molecular weight glycol. The quantity of diphenyl methane diisocyanate amounts to 47 g.
$T_1$ = 8 seconds
$T_2$ = 30 seconds
$T_3$ = 55 seconds
$T_4$ = 55 seconds
After mold release, a highly elastic, semi-rigid foam molding having a particularly low unit weight is obtained.

EXAMPLE 7

The procedure is as in Example 6 using 2-(6-aminohexylthio)-aniline.
$T_1$ = 8 seconds $T_2$ = 28 seconds
$T_3$ = 47 seconds
$T_4$ = 49 seconds
After mold release, a highly elastic foam molding having a low unit weight is obtained.

EXAMPLE 8

Recipe:
350.0 g of a polyester of phthalic acid/adipic acid and ethylene glycol (OH-number: 64.1)
87.4 g of a propoxylated adduct of 2-butene-1,4-diol and $NaHSO_3$ (molecular weight: 427; 66% in toluene)
9.0 g of 1,4-butane diol
102.3 g of 1,6-hexamethylene diisocyanate
58.5 g of o-aniline aminoethyl thioether
1250.0 g of desalted water (a) The polyester and the adduct are dehycrated while stirring at 110° C. in a water jet vacuum. The mixture is cooled to 80° C. and the butane diol is stirred in. After stirring for 10 minutes, the diisocyanate is added, followed by stirring at 80° C. until an NCO-value of 2.8 is obtained (approximately 2 hours). The diamine is then added at 60° C., followed by stirring at 60° C. until the melt is free from NCO (approximately 30 minutes). The solid may readily be converted with water into a finely divided dispersion which, for a solids content of 30.4%, has a Ford cup viscosity (4 mm orifice) of 12 seconds. The solid has an average molecular weight of 3280 and contains 23.6 milliequivalents per 100 g (1.89%) of $SO_3^{\ominus}$-groups.

(b) 607 g of the above dispersion are stirred for 10 minutes with 9.6 g of an 80:20 mixture of 2,4- and 2,6-diisocyanatotoluene. Thereafter another 9.6 g of the above isocyanate mixture are added, as in German Offenlegungsschrift No. 2,708,442, followed by stirring until no more isocyanate can be detected. A non-sedimenting dispersion showing a Tyndall effect in transmitted light is obtained. For a solids content of 32.8%, the dispersion has a Ford cup viscosity (4 mm orifice) of 12.7 seconds. It has a pH-value of 4.5. A film of this dispersion is extremely rigid and does not stick.

EXAMPLE 9

18.4 g of a bis-epoxide corresponding to the formula

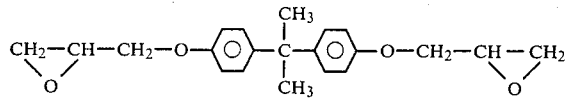

dissolved in 50 g of acetone are added at room temperature to 601 g of the dispersion of Example 8a. The mixture is then heated to 80° C. and stirred for 4 hours at that temperature. At the same time, the small quantity of acetone is distilled off in a water jet vacuum. The dispersion obtained is stable to centrifuging (15 minutes at 3500 rpm) and has a Ford cup viscosity (4 mm nozzle) of 14.4 seconds for a solids content of 39.5%. The pH-value amounts to 4.5. The dispersion may be used for example as an adhesive coating on a variety of different materials such as textiles or leather.

EXAMPLE 10

11.4 g of liquefied, warm 4,4′-diisocyanatodiphenyl methane are added to 500 g of the dispersion of Example 8a and the mixture is slowly heated with stirring to 80° C. Thereafter stirring is continued for 4 hours at that temperature, by which time the dispersion is isocyanate-free.

A finely divided dispersion with a Tyndall effect in transmitted light is obtained. The dispersion has a pH-value of 7.5 and a Ford cup viscosity (4 mm orifice) of 35.3 seconds for a solids content of 35.3%.

A film of the dispersion is tack-free and rigid.

What is claimed is:

1. Polyurethane plastic, which may be cellular, produced by the reaction of organic polyisocyanates with relatively high molecular weight polyhydroxyl compounds and, optionally, low molecular weight polyhydroxyl compounds; and diamines, said polyurethane plastic containing structural units corresponding to the general formula;

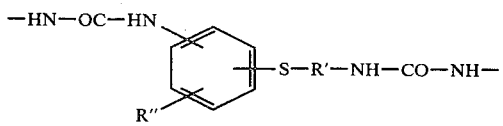

in which
R′ represents a straight or branched divalent aliphatic or cycloaliphatic radical containing from 2 to 20 carbon atoms and
R″ represents hydrogen, a straight or branched alkyl radical containing from 1 to 6 carbon atoms, an aryl radical containing from 6 to 15 carbon atoms, a cycloalkyl radical containing from 4 to 12 carbon atoms, halogen, —NO$_2$, —CN, —OR‴ or a radical

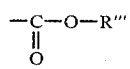

where
R‴ represents a straight or branched alkyl radical containing from 1 to 6 carbon atoms.

2. Polyurethane plastics as claimed in claim 1, wherein R″ represents hydrogen.

3. The polyurethane plastics of claim 1 wherein R″ represents an optionally branched alkyl radical containing 1 to 3 carbon atoms, an aryl radical containing from 6 to 10 carbon atoms or a cycloalkyl radical containing from 6 to 9 carbon atoms.

4. The polyurethane plastics of claim 1 wherein the urea group in said structural units of said diamines is in the ortho or meta position to the sulfur.

5. The polyurethane plastics of claim 1 wherein said relatively high molecular weight polyhydroxyl compounds have a molecular weight of from 400 to 10,000.

6. The polyurethane plastics of claim 5 wherein said polyhydroxyl compounds are selected from the group consisting of polyesters, polyethers, polythioethers, polyacetals, polycarbonates, and polyester amides and wherein said polyhydroxyl compounds contain two to four hydroxyl groups.

7. The polyurethane plastics of claim 1 wherein said low molecular weight polyhydroxyl compounds have a molecular weight of from 32 to 400 and have at least two hydroxyl groups.

8. The polyurethane plastics of claim 1 wherein the molar ratio of polyisocyanates to compounds containing hydroxyl and amino groups is between 0.9:1 and 1.5:1.

9. The polyurethane plastics of claim 8 wherein said molar ratio is between 1.05:1 and 1.25:1.

10. The polyurethane plastics of claim 1 wherein the molar ratio of reactive hydrogen in the diamine to reactive hydroxyl groups is between 0.4:1 and 1.5:1.

11. In a process for the production of polyurethane plastics comprising reacting:
(a) organic polyisocyanates;
(b) compounds containing at least 2 hydroxyl groups and having a molecular weight of from 400 to 10,000;
(c) optionally low molecular weight polyhydroxyl compounds; and
(d) sulfur-containing diamines as chain extenders, the improvement wherein said diamines correspond to the formula

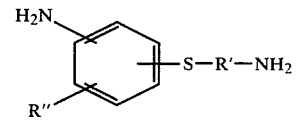

in which
R′ represents a straight or branched divalent aliphatic or cycloaliphatic radical containing from 2 to 20 carbon atoms and represents hydrogen, a straight or branched alkyl radical containing from 1 to 6 carbon atoms, an aryl radical containing from 6 to 15 carbon atoms, a cycloalkyl radical containing from 4 to 12 carbon atoms, halogen, —NO$_2$, —CN, —OR‴ or a radical

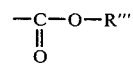

in which
R‴ represents a straight or branched alkyl radical containing from 1 to 6 carbon atoms.

12. A process as claimed in claim 11, wherein said diamines correspond to the formula

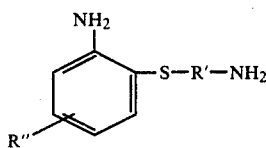

in which R' and R" are as defined in claim 11.

13. A process as claimed in claim 11, wherein said diamines correspond to the formula

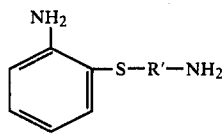

in which R' is as defined in claim 11.

14. The process of claim 11 wherein R" represents an optionally branched alkyl radical containing 1 to 3 carbon atoms, an aryl radical containing from 6 to 10 carbon atoms or a cycloalkyl radical containing from 6 to 9 carbon atoms.

15. The process of claim 13 wherein R' represents a straight or branched chain aliphatic hydrocarbon radical containing from 2 to 12 carbon atoms.

16. The process of claim 12 wherein said component (b), compounds containing at least 2 hydroxyl groups are selected from the group consisting of polyesters, polyethers, polythioethers, polyacetals, polycarbonates, and polyester amides and contain two to four hydroxyl groups.

17. The process of claim 11 wherein said low molecular weight polyhydroxyl compounds have a molecular weight of from 32 to 400 and have at least two hydroxyl groups.

18. The process of claim 11 wherein the molar ratio of polyisocyanates to compounds containing hydroxyl and amino groups is between 0.9:1 and 1.5:1.

19. The process of claim 18 wherein said molar ratio is between 1.05:1 and 1.25:1.

20. The process of claim 11 wherein the molar ratio of reactive hydrogen in the diamine to reactive hydroxyl groups is between 0.4:1 and 1.5:1.

21. Polyurethane plastics as claimed in claim 1, wherein said diamines correspond to the formula

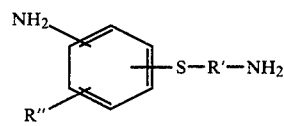

in which
R' represents a straight or branched divalent aliphatic or cycloaliphatic radical containing from 2 to 20 carbon atoms and
R" represents hydrogen, a straight or branched alkyl radical contaning from 1 to 6 carbon atoms, an aryl radical containing from 6 to 15 carbon atoms, a cycloalkyl radical containing from 4 to 12 carbon atoms, halogen, —NO$_2$, —CN, —OR''' or a radical

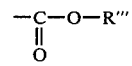

where
R''' represents a straight or branched alkyl radical containing from 1 to 6 carbon atoms.

22. Polyurethane plastics as claimed in claim 21 wherein R" of said diamines is hydrogen.

* * * * *